United States Patent
Shin et al.

(10) Patent No.: US 7,315,694 B2
(45) Date of Patent: Jan. 1, 2008

(54) APPARATUS FOR SWITCHING OPTICAL CHANNEL OVERHEAD IN OPTICAL SUPERVISORY CHANNEL OF OPTICAL TRANSPORT NETWORK SYSTEM AND APPARATUS FOR FORWARDING OPTICAL CHANNEL MAINTENANCE SIGNAL

(75) Inventors: Jong-Yoon Shin, Gyeonggi-do (KR); Kyung-Gyu Jeon, Daejon (KR); Je-Soo Ko, Daejon (KR)

(73) Assignee: Electronics and Telecommunications Research Institute (KR)

( * ) Notice: Subject to any disclaimer, the term of this patent is extended or adjusted under 35 U.S.C. 154(b) by 555 days.

(21) Appl. No.: 10/903,548

(22) Filed: Jul. 29, 2004

(65) Prior Publication Data

US 2005/0078959 A1    Apr. 14, 2005

(30) Foreign Application Priority Data

Nov. 10, 2003    (KR) .................... 10-2003-0079207

(51) Int. Cl.
*H04J 14/00*    (2006.01)
(52) U.S. Cl. .................. 398/57; 398/33; 398/45
(58) Field of Classification Search ........... 398/30, 398/31, 32, 33, 45, 55, 56, 57
See application file for complete search history.

(56) References Cited

U.S. PATENT DOCUMENTS 5,596,730 A * 1/1997 Sekine ................. 710/317
6,314,097 B1 * 11/2001 Ohara .................. 370/392
6,356,368 B1    3/2002 Arao
6,701,088 B1 * 3/2004 Watanabe et al. .......... 398/51
6,771,907 B1 * 8/2004 Yoshifuji et al. .......... 398/59
7,184,661 B1 * 2/2007 Usuba et al. ............. 398/46
2001/0050790 A1 * 12/2001 Graves et al. ............ 359/110
2002/0118419 A1 * 8/2002 Zheng et al. ............. 359/139

FOREIGN PATENT DOCUMENTS

KR    2000-37855    7/2000

OTHER PUBLICATIONS

Switching circuit of optical channel overheads in optical supervisory channel, 3 pages.

* cited by examiner

*Primary Examiner*—Christina Leung
(74) *Attorney, Agent, or Firm*—Blakely, Sokoloff, Taylor & Zafman (57) ABSTRACT

A switching apparatus for switching an optical channel overhead in an optical supervisory channel is disclosed. The switching apparatus can suppress a terminated optical channel defect occurred by a defect of upper layers of the optical channel or a defect of the optical channel transmitter and also can maintain the corresponding optical channel at the wavelength converted optical transport network system. Furthermore, an apparatus for forwarding an optical channel maintenance signal is disclosed too. The apparatus includes the switching apparatus and transmits only an add and drop optical channel maintenance signal information to the CPU and generate the LOS suppression signal with respect to the optical channel according to the occurrence of malfunction, thus directly transmitting the suppression signal to the corresponding optical channel unit.

8 Claims, 6 Drawing Sheets

APPARATUS FOR SWITCHING OPTICAL CHANNEL OVERHEAD IN OPTICAL SUPERVISORY CHANNEL OF OPTICAL TRANSPORT NETWORK SYSTEM AND APPARATUS FOR FORWARDING OPTICAL CHANNEL MAINTENANCE SIGNAL

FIELD OF THE INVENTION

The present invention relates to an apparatus for switching an optical channel overhead in an optical supervisory channel of an optical transport network system; and, more particularly, to an apparatus for switching an optical channel overhead in an optical supervisory channel of a multi-channel wavelength division multiplexing (WDM) system, an optical add/drop multiplex (OADM) system or an optical cross connect (OXC) system.

DESCRIPTION OF RELATED ART

At present, in International Telecommunication Union-Telecommunication Standardization Sector (ITU-T), a hierarchical structure of an optical transport network system is divided into an optical channel data unit (ODU), an optical channel transport unit (OTU), an optical channel (OCh), an optical physical section (OPS), an optical multiplex section (OMS), and an optical transmission section (OTS).

An optical supervisory channel of the optical transport network system transports optical transport module overheads of an optical channel layer, optical multiplex section layer and optical transmission section layer.

Figure 1:
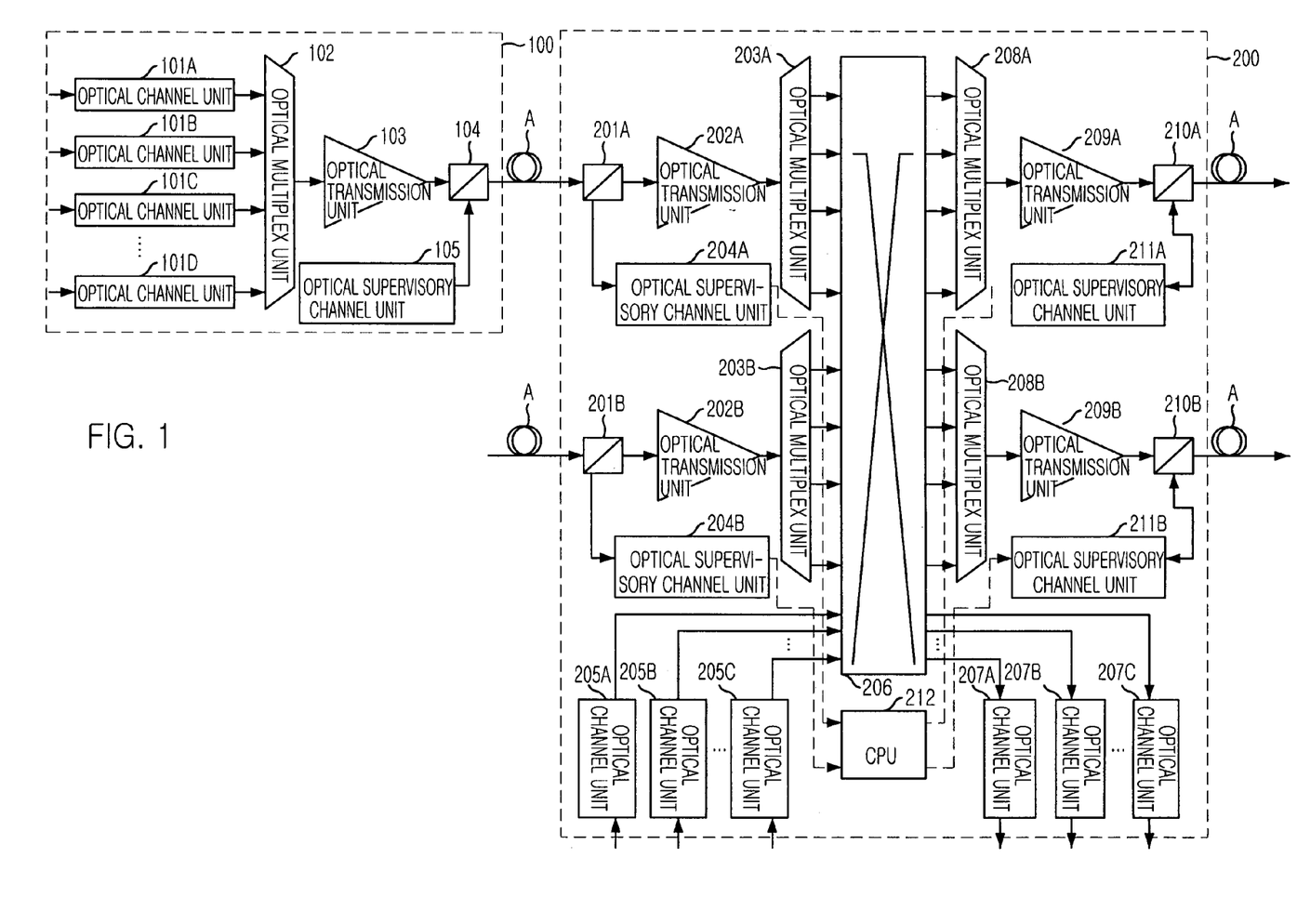
FIG. 1 is a schematic diagram illustrating a structure of a general optical transport network system.

FIG. 1 is a schematic diagram illustrating a structure of a general optical transport network system, especially a structure of an optical cross-connect (OXC) system.

Referring to FIG. 1, a general optical transport network system includes a terminal WDM system 100 and an OXC system 200. The terminal WDM system 100 and the OXC system 200 are mutually coupled through optical fibers A.

The terminal WDM system 100 includes a first optical channel unit 101, a first optical multiplex unit 102, a first optical transmission unit 103, a first WDM coupler 104, and a first optical supervisory channel unit 105.

The OXC system 200 includes a second WDM coupler 201, a second optical transmission unit 202, a second multiplex unit 203, a second optical supervisory channel unit 204, an add optical channel unit 205, an optical switch 206, a drop optical channel unit 207, a third optical multiplex unit 208, a third optical transmission unit 209, a third WDM coupler 210, a third optical supervisory channel unit 208, and a central processing unit (CPU).

According to the optical transport network system constructed as above, the first optical transmission unit 103 amplifies a multiplexed optical signal received from the first optical multiplex unit 102 to a predetermined level. The first WDM coupler 104 couples the amplified optical signal from the first optical transmission unit 103 and an optical supervisory channel signal from the first optical supervisory channel unit 105, and then, transports the coupled signal to the OXC system 200.

Then, the second WDM coupler 201 of the OXC system 200 separates the received signal into a main optical signal and a supervisory control optical signal. The second optical transmission unit 202 amplifies main optical signal to a predetermined level and the second optical supervisory channel unit 204 receives the optical supervisory channel signal.

The second optical multiplex unit 203 separates optical channel signals depending on respective wavelengths from the amplified optical signal of several wavelengths. The optical switch 206 switches the separated optical channel signals and optical channel signals, which are added from the add optical channel unit 205, to corresponding third optical multiplex unit 208 or drop optical channel unit 207. The third optical multiplex unit 208 multiplexes the switched optical channel into one main optical signal and transmits it to the third optical transmission unit 209, thus amplifying the main optical signal to a predetermined level.

The third WDM coupler 210 couples the amplified optical signal and the optical supervisory channel signal and transmits the coupled signal to other OXC system or other terminal WDM system of the optical transport network system.

In the conventional optical transport system, the optical supervisory channel unit such as the first optical supervisory channel unit and the second optical supervisory channel unit forms point-to-point connections at optical transmission sections.

The optical transmission section overhead transmitted from the optical supervisory channel unit is added at an optical transmission section start point and dropped at an optical transmission section end point. The optical multiplex section overhead transmitted from the optical supervisory channel unit is coupled in the point-to-point connection of each system of the optical multiplex section. Therefore, the optical supervisory channel unit must be able to add and drop the optical multiplex section overhead signals between systems by passing through the optical multiplex section overhead signals between the optical transmission sections.

However, the optical channel overhead transmitted from the optical supervisory channel unit can not be added at an optical channel start point and dropped at an optical channel end point only by passing through the optical channel overhead signals between the optical transmission sections. It is possible to maintain the respective optical channels when the optical channel overhead is configured with the point-to-point connection between the optical channels, not between the systems.

In other words, the optical channel overhead is added or dropped at a position where the optical channel is added or dropped, not at a position where the optical supervisory channel unit is located.

Accordingly, it is impossible to maintain the optically switched optical channel with the optical channel overhead, only using the optical supervisory channel unit that connects the existing systems.

In order to solve this problem, the second optical supervisory channel unit 204 of the OXC system 200 receives the optical channel overhead signals according to the respective links and transmits them to the CPU 212. The CPU 212 again generates the optical overhead signals and transmits them to the third optical supervisory channel unit 211. Thus, it is possible to transmit the optical channel overhead signals to the terminated optical channel.

In this way, the conventional optical transport network system must collect the layer-based overhead signals according to the links at the CPU and must generate the layer-based overhead signals for the operational maintenance by processing the collected layer-based overhead signals and must transmit them to the third optical supervisory channel unit 211. Therefore, resources of the CPU are wasted and efficiency is degraded in the transmission of the optical overhead signals to the terminated optical channels.

Also, most of the conventional optical transport network systems transmit the optical channel overhead signals from the optical supervisory channel unit to the CPU, so that it takes long time and many resources to maintain the optical channel with the optical channel overhead signals. Therefore, it is difficult to control the optical transport network plane in real time.

SUMMARY OF THE INVENTION

It is, therefore, an object of the present invention to provide an apparatus for switching an optical channel overhead in an optical supervisory channel of an optical transport system, in which a signal for maintaining an optical signal is rapidly transmitted using an optical supervisory channel.

It is another object of the present invention to provide an apparatus for forwarding an optical maintenance signal using the apparatus for switching an optical channel overhead in the optical supervisory channel of the optical transport network system, in which an optical channel maintenance signal for an optical channel coupled to the optical transport network system is effectively generated and transmitted to a corresponding optical channel unit using a dropped optical channel overhead signal.

In an aspect of the present invention, there is provided an apparatus for switching an optical channel overhead in an optical supervisory channel of an optical transport network system, the optical transport network system including an optical supervisory channel reception unit, an optical supervisory channel transmission unit and a central processing unit, the apparatus comprising: a plurality of signal input units for retiming an optical overhead signal received in serial connection from the optical supervisory channel transmission unit, converting a corresponding signal into a parallel data signal, and generating a storage address matching with the corresponding signal; a plurality of signal storage units for storing a parallel optical channel overhead signal according to the storage address information, and outputting a stored optical channel overhead signal information according to a switching address; a switching table storage unit for storing an optical channel overhead switching information received from the central processing unit, transmitting the stored optical channel overhead switching information according to a read storage address to the central processing unit, receiving the switching address with respect to an optical channel overhead signal to be switched and outputted, and generating the storage address of the corresponding optical channel overhead signal according to the stored switching information; a signal output timing unit for generating the switching address of the corresponding optical channel overhead signal according to an optical channel overhead signal to be outputted, and generating a first timing for aligning a switched data to a corresponding link, a second timing for converting the aligned optical channel overhead signal data into a serial data, and a third timing for outputting the aligned optical channel overhead signal data; a plurality of data alignment units for receiving the switched optical channel overhead signal and aligning the optical channel overhead signal to a corresponding link and channel using the first timing; a drop data alignment unit for receiving a switched drop optical channel overhead signal and aligning a drop optical channel overhead signal using the first timing; and a plurality of signal output units for receiving aligned parallel data from the plurality of data alignment units according to the links, converting the aligned parallel data into serial data according to the second timing, and transmitting the received optical channel overhead signal to the optical supervisory channel transmission unit of the corresponding link.

In another aspect of the present invention, there is provided an apparatus for forwarding an optical channel maintenance signal in the optical transport network system using the apparatus for switching an optical channel overhead of the optical supervisory channel, comprising: a first extraction unit for extracting an OCI maintenance signal from the drop optical channel overhead signal received from the drop data alignment unit; a second extraction unit for extracting a FDI maintenance signal from the drop optical channel overhead signal received from the drop data alignment unit; an input unit for receiving an OCI maintenance signal input data from the central processing unit; a first signal comparison unit for performing a logical OR operation of signals received from the first extraction unit and the input unit and combining the OCI maintenance signal; a first signal storage unit for storing the combined OCI maintenance signal; a second signal comparison unit for storing the FDI maintenance signal; and a second signal comparison unit for performing a logical OR operation of signals received from the first and second signal storage units and generating an optical channel LOS suppression signal.

In the optical transport network system, the optical channel overhead signals received at the respective links are switched according to the optical channel switching signal, and then are transmitted to the corresponding links with the add optical channel overhead signals or are dropped to the drop optical channel. Therefore, the optical channel maintenance signal can be rapidly forwarded up to the system at which the switched optical channel is terminated.

Meanwhile, a line-out-of-service (LOS) suppression signal is generated according to the optical maintenance signal received from the optical supervisory channel unit and the maintenance signal received from the central processing unit, thus the signal is rapidly transmitted to the corresponding channel unit through a direct connection.

In this invention, the optical channel overhead signal includes an OCh-FDI-P (hereinafter, referred to as "FDI") and an OCh-FDI-O signal and OCh-OCI (hereinafter, referred to as "OCI") signal.

The FDI signal is a signal that reports an upper layer's payload signal loss or a payload defect occurred at a lower layer. The OCh-FDI-O signal is a signal that reports an upper layer's overhead signal loss or an overhead defect occurred at a lower layer. Also, the OCI signal is a signal that reports a connection of the optical channel by an operator.

The optical channel overhead signal is not limited to the above signals. In other words, the optical channel overhead signal can be configured with various signals and thus it is possible to be available by increasing the number of input data in the optical channel switching.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Hereinafter, the present invention will be described in detail with reference to the accompanying drawings.

Figure 2A:
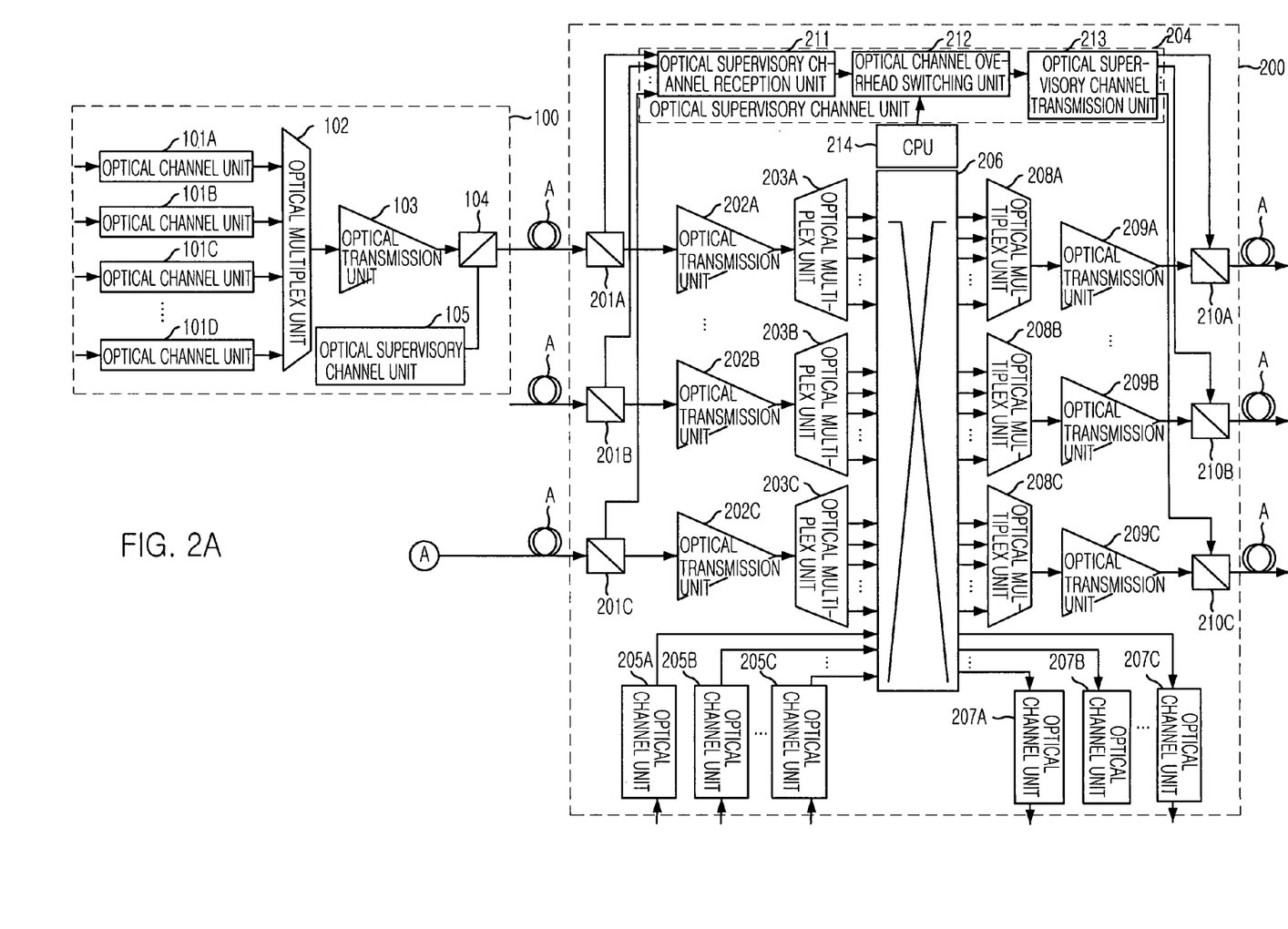
FIGS. 2A and 2B are schematic diagrams illustrating a structure of an optical transport network system in accordance with an embodiment of the present invention.
Figure 2B:
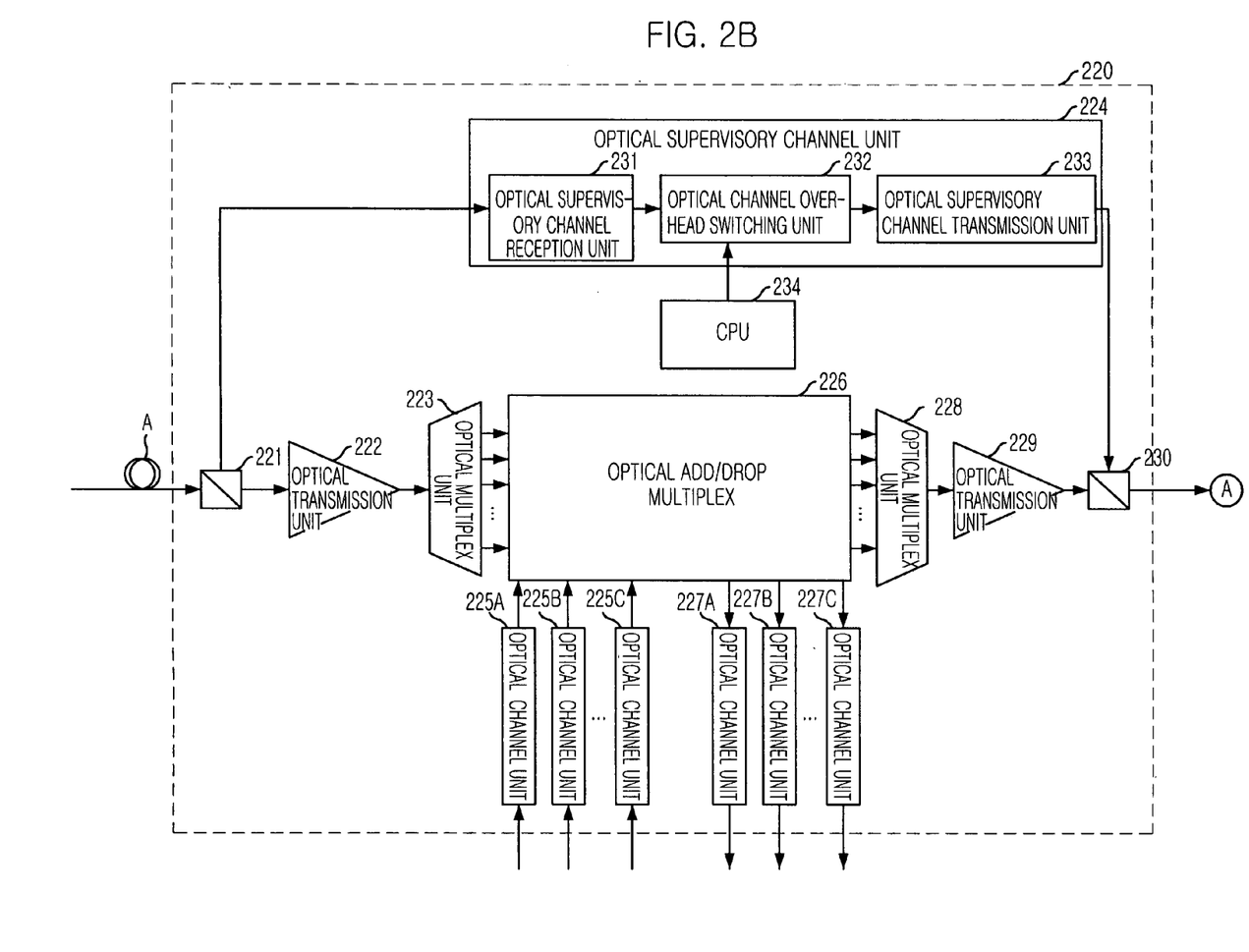

FIGS. 2A and 2B illustrate an optical transport network system in accordance with an embodiment of the present invention.

Referring to FIGS. 2A and 2B, an optical transport network system in accordance with the present invention includes a terminal WDM system 100, an OADM system 200, and an OXC system 220.

The terminal WDM system 100 includes a first optical channel unit 101, a first optical multiplex unit 102, a first optical transmission unit 103, a first WDM coupler 104, and a first optical supervisory channel unit 105.

The OXC system 200 includes a second WDM coupler 201, a second optical transmission unit 202, a second multiplex unit 203, a second optical supervisory channel unit 204, a first add optical channel unit 205, an optical switch 206, a first drop optical channel unit 207, a third optical multiplex unit 208, a third optical transmission unit 209, and a third WDM coupler 210.

The OADM system 220 includes a fourth WDM coupler 221, a fourth optical transmission unit 222, a fourth optical multiplex unit 223, a third optical supervisory channel unit 224, a second add optical channel unit 225, an optical add/drop multiplex 226, a second drop optical channel unit 227, a fifth optical multiplex unit 228, a fifth optical transmission unit 229, and a fifth WDM coupler 230.

An operation for main optical signal is identical to the conventional optical transport network system. A difference is that the optical supervisory channel units of the OXC system 200 and the OADM system 220 integrate the respective links and include an apparatus for switching the optical channel overhead therein.

The apparatus for switching the optical channel overhead in accordance with the present invention will be referred to as an "optical channel overhead switching unit" 212.

An operation of the optical supervisory channel unit 204 in the OXC system 200 will now be described. First, the second WDM couplers 201 of the respective links separate the received optical signal into a main optical signal and a supervisory control optical signal and input the separated supervisory control optical signal to the second optical supervisory channel unit 204.

The optical supervisory channel reception unit 211 converts the inputted supervisory control optical signals into electric signals. An optical channel overhead signal is extracted and transmitted to the optical channel overhead switching unit 212.

Then, the optical channel overhead switching unit 212 receives optical channel switching information from the CPU 214 and switches the corresponding optical channel overheads according to the optical channel switching information to transmit them to the optical supervisory channel transmission unit 213 of the corresponding link. At the optical supervisory channel transmission unit 213, the supervisory control signals are collected and converted into supervisory control optical signals, and then transmitted to the third WDM coupler 210.

An operation of the third optical supervisory channel unit 224 of the OADM system 220 is similar to that of the OXC system 200.

First, the fourth WDM coupler 221 separates the received optical signal into a main optical signal and a supervisory control optical signal and inputs the separated supervisory control optical signal to the third optical supervisory channel unit 224.

The optical supervisory channel reception unit 231 converts the inputted supervisory control optical signals into electric signals. An optical channel overhead signal is extracted and transmitted to the optical channel overhead switching unit 232.

Then, the optical channel overhead switching unit 232 receives optical channel switching information about the respective added channels and dropped channels from the CPU 234, drops the optical channel overheads with respect to the corresponding drop optical channels according to the received optical channel overhead switching information, and adds the optical channel overheads with respect to the corresponding add optical channels. The added and passed optical channel overhead signals in the optical channel overhead switching unit 232 are transmitted to the optical supervisory channel transmission unit 233.

At the optical supervisory channel transmission unit 223, the received optical channel overhead signals and the overhead signals of different layers are collected and converted into optical supervisory control signals, and then the optical supervisory control signals are transmitted to the fifth WDM coupler 230.

In this manner, the optical supervisory channel unit having the optical channel overhead switching unit of the present invention can collectively process the optical supervisory channels according to the respective links in the optical transport network system. At the same time, the optical channel overhead switching unit can directly receive the optical channel overhead signals, perform a switching process, and rapidly transmit the corresponding maintenance signals up to the terminated optical channels.

In other words, the optical supervisory channel unit does not transmit the optical channel overhead signal information to the CPU at a time, the CPU transmits only the switching information of the optical channels to the optical supervisory channel unit and the optical supervisory channel unit transmits only the terminated optical channel overhead signal at the system.

In this manner, the burdens on switching and receiving the overhead signals are reduced at the CPU and the performance of switching is enhanced. Because the optical channel overhead switching becomes faster at the optical supervisory channel unit than at the CPU. Therefore, the maintenance of the optical channel can be achieved within a fast time.

Hereinafter, the apparatus for switching the optical overhead in the optical supervisory channel of the optical transport network system in accordance with the present invention will be described with reference to the accompanying drawings.

Figure 3:
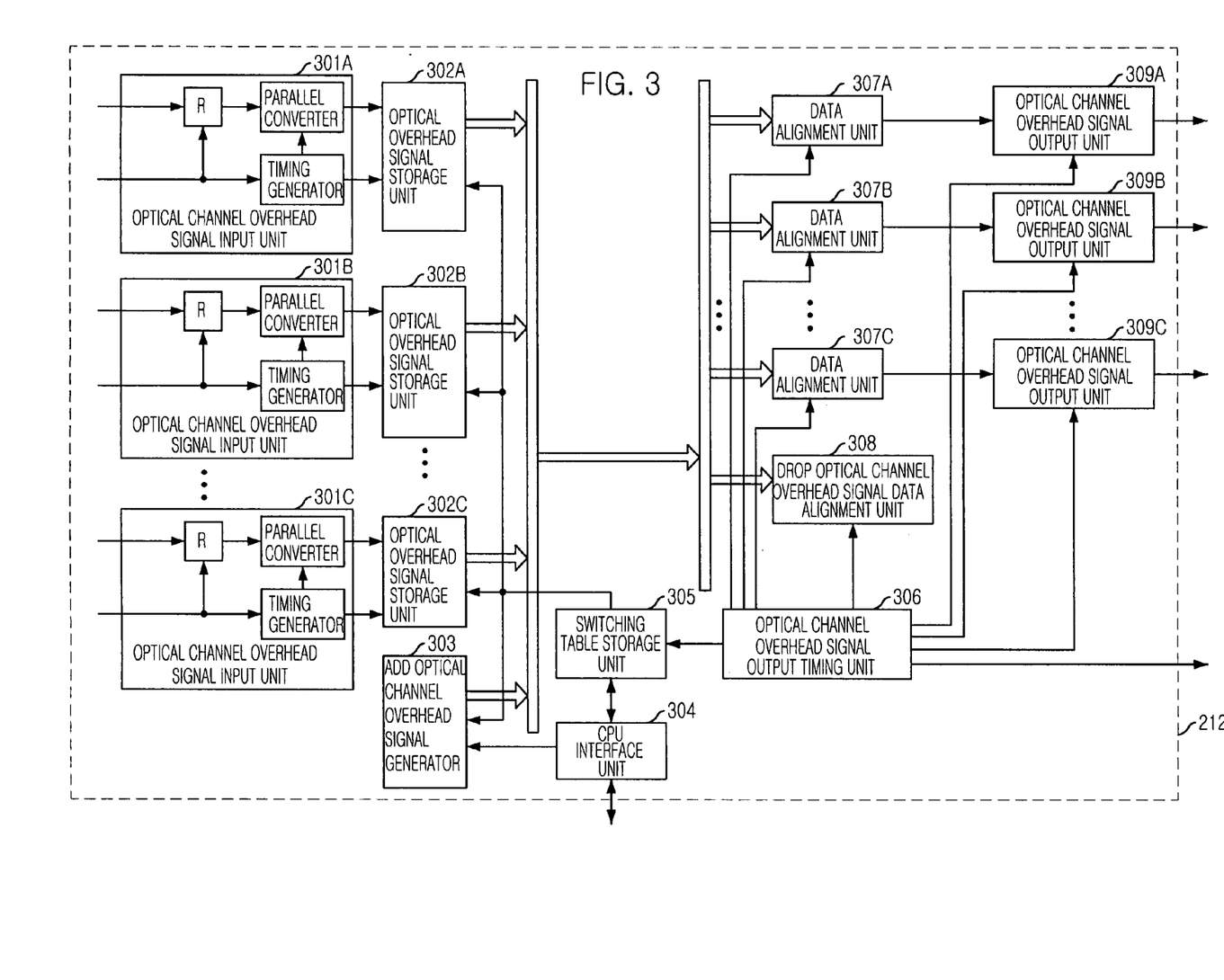
FIG. 3 is a block diagram illustrating the apparatus for switching the optical channel overhead in the optical supervisory channel of the optical transport network system in accordance with the present invention.

FIG. 3 is a block diagram illustrating the apparatus for switching the optical channel overhead in the optical supervisory channel of the optical transport network system in accordance with the present invention.

Referring to FIG. 3, the apparatus for switching the optical channel overhead includes optical channel overhead signal input units 301 for each link, optical channel overhead signal storage units 302 for each link, an add optical channel overhead signal storage unit 303, a CPU interface unit 304, a switching table storage unit 305, an optical channel overhead signal output timing unit 306, data alignment units 307 for each link, a drop optical channel overhead signal data alignment unit 308, and optical channel overhead signal output units 309 for each link.

First, the optical channel overhead signal input unit 301 performs a retiming to optical channel overhead signals received in a serial connection from the optical supervisory channel reception unit 211 of the optical supervisory channel unit 204, converts the optical channel overhead signals into parallel data signals, generates storage addresses that match with the optical channel overhead signals, and transmits the storage addresses to the optical channel overhead signal storage units 302.

With regard to the storage addresses, a reference timing is inputted from the optical supervisory channel reception unit 211, or it is generated from the optical overhead signal input unit 301 and transmitted to the optical supervisory channel reception unit 211, such that the optical channel overhead signal data storage addresses can be generated.

The optical channel overhead signal storage units 302 for each link stores the optical channel overhead signals according to the parallel optical channel overhead signals and the storage address information, which are received from the optical channel overhead signal input units 301, receives the switching addresses from the switching table storage unit 305, and outputs the stored parallel optical channel overhead signal information according to the corresponding addresses.

The add optical channel overhead signal storage unit 303 stores the add optical channel overhead signal, which is received from the CPU interface unit 304, and outputs the stored add optical channel overhead signal information according to the switching addresses, which are received from the switching table storage unit 305.

The CPU interface unit 304 receives the switching information of the optical channel overhead from the CPU 214 and transmits data and addresses to the switching table storage unit 305. Also, when the switching information of the optical channel overhead is read out at the CPU 214, the CPU interface unit 304 transmits the optical channel switching information storage addresses to the switching table storage unit 305 and then transmits the switching information of the optical channel overhead received from the switching table storage unit 305 to the CPU 214.

The CPU interface unit 304 receives the overhead signals of the add optical channel from The CPU 214 and transmits the corresponding addresses and the add optical channel overhead signal data to the add optical channel overhead signal storage unit 303.

The switching table storage unit 305 stores the optical channel overhead switching information received from the CPU interface unit 304 and transmits the stored optical channel overhead switching information to the CPU interface unit 304 such that the CPU 214 can read out the stored optical channel overhead switching information.

The optical channel overhead signal output timing unit 306 receives the stored switching information for the optical channel overhead signals to be switched, and generates the corresponding addresses of the optical channel overhead signals according to the stored switching information, and transmits the addresses to the optical channel overhead signal storage units 302 or the add optical channel overhead signal storage unit 303.

In this manner, the CPU 214 transmits only the switching information of the optical channels to the optical supervisory channel unit 204 without receiving all the optical channel overhead signal information and switching the optical channel overhead signals according to the optical channel switching information, such that the burden of the CPU 214 is reduced and the time and resource is efficiently saved at the same time because all the optical channel overhead signals need not be transmitted or received to or from the CPU 214 at every period.

The optical channel overhead signal output timing unit 306 performs a switching according to the output timing, generates the switching addresses for outputting the corresponding optical channel overhead signals, and transmits the switching addresses to the switching table storage unit 305. At the same time, the optical channel overhead signal output timing unit 306 generates a timing for aligning data outputted by the switching to the corresponding link, and transmits the timing to the respective data alignment units 307 and the drop optical channel overhead signal data alignment unit 308.

Also, the optical channel overhead signal output timing unit 306 generates a timing for converting the aligned optical channel overhead parallel signal data into serial data or an output timing for outputting the data to the optical supervisory channel transmission unit 213, and transmits the timing to the optical supervisory channel transmission unit 213.

Meanwhile, the data alignment units 307 or the drop optical channel overhead signal data alignment unit 308 receives the switched optical channel overhead signals from the optical channel overhead signal storage units 302 and 303, and the data alignment units 307 or the drop optical channel overhead signal data alignment unit 308 receives the timing of aligning the corresponding data from the optical channel overhead signal output timing unit 306, such that the optical channel overhead signals are aligned with the corresponding links and channels according to the switching information.

The data alignment units 307 transmit the aligned data to the optical channel overhead signal output unit 309.

The drop optical channel overhead signal data alignment 308 receives the alignment timing from the optical channel overhead signal output timing unit 306, aligns the drop optical channel overhead signals, and transmits the drop optical overhead signals to the CPU 214 through the CPU interface unit 304, and also transmits the drop optical channel overhead signals to an optical channel maintenance signal forwarding apparatus 400.

The optical channel overhead signal output unit 309 receives and converts the aligned parallel data into the serial data according to the timing received from the optical channel overhead signal output timing unit 306, and transmits the serial data to the optical supervisory channel transmission unit 214 of the corresponding link.

Figure 4:
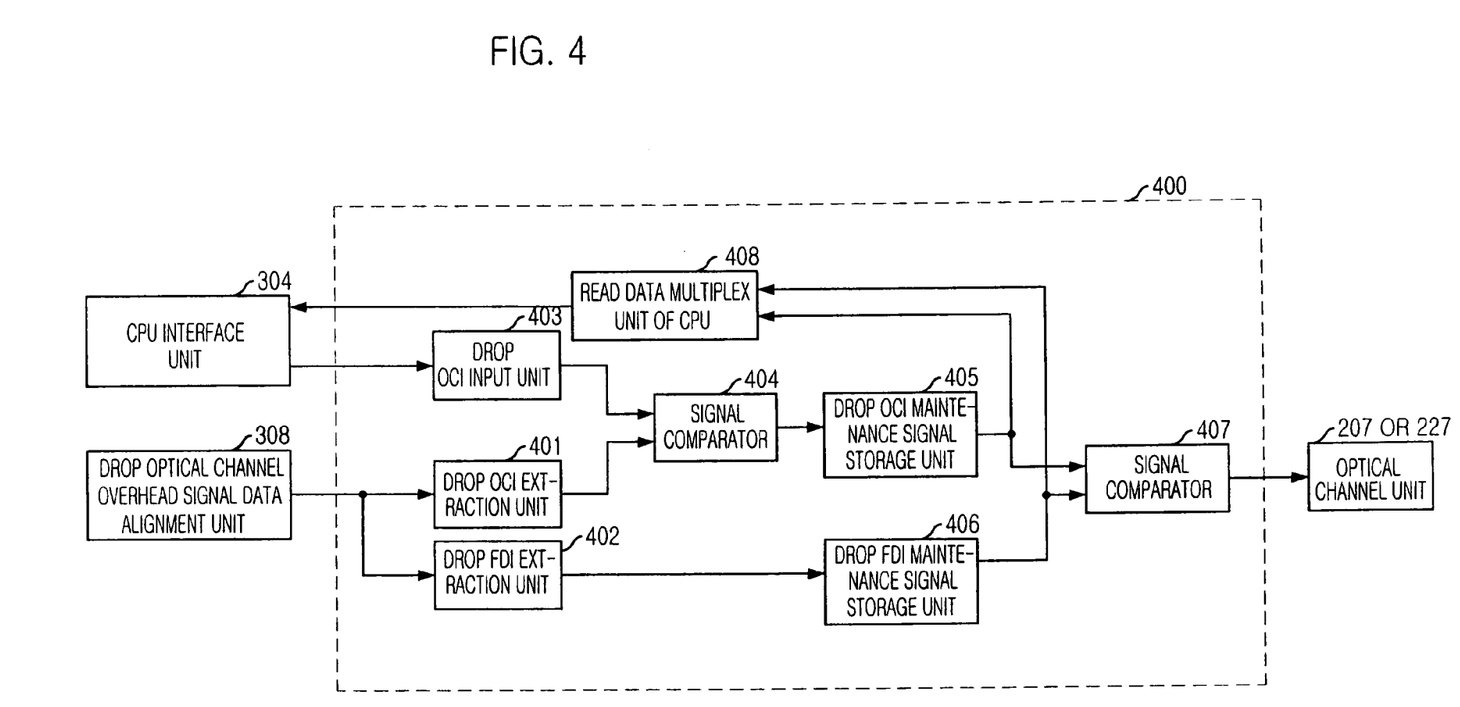
FIG. 4 is a block diagram illustrating an apparatus for forwarding an optical channel maintenance signal using an apparatus for switching an optical channel overhead in an optical supervisory channel of an optical transport network system in accordance with an embodiment of the present invention.

FIG. 4 is a block diagram illustrating the optical channel maintenance signal forwarding apparatus using the optical channel overhead switching apparatus of the optical supervisory channel in the optical transport network system in accordance with the present invention.

Referring to FIG. 4, the optical channel maintenance signal forwarding apparatus 400 of the optical supervisory channel unit 204 (224) in accordance with the present invention includes a drop OCI extraction unit 401, a drop FDI extraction unit 402, a drop OCI input unit 403, a first signal comparator 404, a drop OCI maintenance signal storage unit 405, a drop FDI maintenance signal storage unit 406, a second signal comparator 407, and a read data multiplex unit 408.

First, the drop OCI extraction unit 401 extracts an OCI maintenance signal of the present invention from the drop optical channel overhead signals received from the drop optical channel overhead signal data alignment unit 308 of the optical supervisory channel unit 204 (224), and transmits the extracted OCI maintenance signal to the first signal comparator 404.

At this point, the drop OCI extraction unit 401 extracts OCh-FDI-O signal among the drop optical channel overhead signals received according to the links. If the extracted OCh-FDI-O signal is activated, the drop OCI extraction unit 401 suppresses the activation of the drop OCI maintenance signal with respect to the corresponding channel.

The drop FDI extraction unit 402 extracts the FDI maintenance signal of the present invention among the drop optical channel overhead signals received from the drop optical channel overhead signal data alignment units 308 of the optical channel overhead switching unit 212, and outputs the extracted FDI maintenance signal to the drop FDI maintenance signal storage unit 406.

At this point, the drop FDI extraction unit 402 extracts OCh-FDI-O signal among the drop optical channel overhead signals received according to the links. If the extracted OCh-FDI-O signal is activated, the drop FDI extraction unit 402 suppresses the activation of the drop FDI maintenance signal with respect to the corresponding channel.

The drop OCI input unit 403 stores the drop OCI maintenance signal input data, which is inputted from the CPU interface unit 304 of the optical channel overhead switching unit 212 by an operator according to an embodiment of the present invention, and outputs the inputted drop OCI maintenance signal to the first signal comparator 404.

The first signal comparator 404 performs a logical OR operation of the drop OCI maintenance signals, which are inputted from the drop OCI extraction unit 401 and the drop OCI input unit 403, and combines the OCI maintenance signal information. Also, the first signal comparator 404 transmits the combined drop OCI maintenance signals to the drop OCI maintenance signal storage unit 405.

The drop OCI maintenance signal storage unit 405 stores the finally-combined drop OCI maintenance signal and transmits the stored drop OCI maintenance signal to the second signal comparator 407 and the multiplex unit 408.

The drop FDI maintenance signal storage unit 406 stores the drop FDI maintenance signal inputted from the drop FDI extraction unit 402 and transmits the stored drop FDI maintenance signal to the second signal comparator 407 and the multiplex unit 408.

The second signal comparator 407 performs a logical OR operation of the drop OCI maintenance signal and the drop FDI maintenance signal, which are respectively inputted from the drop OCI maintenance signal storage unit 405 and the drop FDI maintenance signal storage unit 406, and generates an optical channel LOS suppression signal, which can previously suppress LOS alarm of the optical channel. Also, the second signal comparator 407 transmits the LOS suppression signal to the first drop optical channel unit 207 of the OXC system 200 or the second drop optical channel unit 227 of the OADM system 100.

The optical channel maintenance signal forwarding apparatus 400 using the optical channel overhead switching unit according to the present invention can rapidly transmit the LOS suppression signal to the corresponding drop optical channel unit 207 (227), thus preventing the optical channel defect at the optical channel receiver caused by the defect of upper layers of the optical channel or the defect of the optical channel transmitter.

In other words, the optical channel maintenance signal forwarding apparatus 400 can report the drop optical channel maintenance signals OCI and FDI to the CPU and can rapidly transmit only the optical channel LOS suppression signal to the optical channel unit 207 (227) through the second signal comparator 407.

The burden of the CPU can be reduced by transmitting only the optical channel maintenance signal, not all optical channel maintenance signal, to the CPU of the optical transport network systems 100, 200 and 220, and the waste of resource can be prevented by transmitting only the maintenance signal information with respect to the necessary drop optical channel of the corresponding system.

Figure 5:
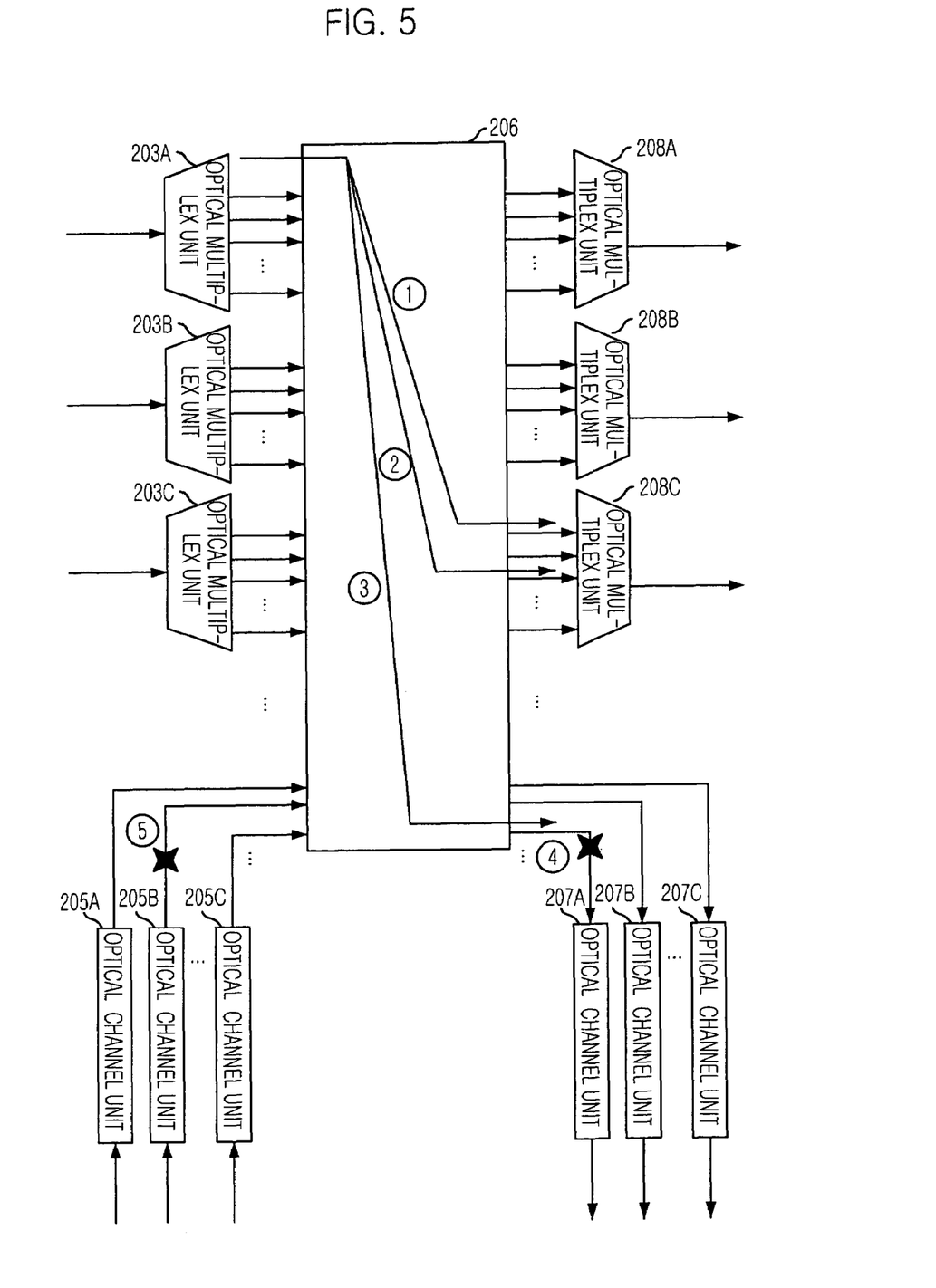
FIG. 5 is a block diagram illustrating an operation of switching an optical channel overhead according to the present invention.

FIG. 5 is a block diagram illustrating the operation of switching the optical channel overhead in accordance with the present invention.

First, in an optical channel switching structure in which an optical channel of wavelength 1 of a link A is inputted and switched into an optical channel of wavelength 1 of a link C, if the optical channel overhead switching unit 212 receives a switching information at the CPU, the optical channel overhead switching unit 212 can switch and output the optical channel overhead information of the incoming channel 1 of the link A as the optical channel overhead of the channel 1 of the link C.

Second, in an optical channel switching structure in which an optical channel of wavelength 1 of a link A is inputted and switched into an optical channel of wavelength 3 of a link C, if the optical channel overhead switching unit 212 receives a switching information at the CPU, the optical channel overhead switching unit 212 can switch and output the optical channel overhead information of the incoming channel 1 of the link A as the optical channel overhead of the channel 3 of the link C.

Third, in an optical channel switching structure in which an optical channel of wavelength 1 of a link A is inputted and an optical channel of wavelength 1 is dropped, if the optical channel overhead switching unit 212 receives a switching information at the CPU, the optical channel overhead switching unit 212 can switch the optical channel overhead of the incoming channel 1 of the link A into the optical channel overhead of the dropped channel 1 and output the switched overhead to the optical channel maintenance signal forwarding apparatus 400.

Fourth, in case the OXC system 200 must switch the optical channel of wavelength 1 to the first drop optical channel unit 207 and the optical channel of wavelength 1 is not coupled to the optical channel unit 207 for the purpose of testing the optical channel switch unit functionally, or in case an optical channel is not in use while the optical channel unit of wavelength 1 is installed in the optical channel unit 207A, a operator's command of inserting the optical channel OCI maintenance signal is transmitted to the CPU and an optical channel OCI maintenance signal is received from the optical channel maintenance signal forwarding apparatus 400. Then, the LOS suppression signal is added to the first optical channel unit 207A and it is reported to the CPU that the OCI maintenance is activated at the first optical channel.

Fifth, in a state that an optical channel of wavelength 2 coupled at the first add optical channel unit 205 of the OXC system 200 is set to be switched to an optical channel of wavelength 2 of a link A, in case where the optical channel of wavelength 2 is not coupled to the first add optical channel unit 205B of wavelength 2, or in case where an optical channel is not in use while the optical channel unit of wavelength is installed in the optical channel unit 205B, a operator's command of inserting the second add optical channel OCI maintenance signal is transmitted to the CPU and the second add optical channel OCI maintenance signal is activated and stored in the add optical channel overhead signal storage unit 103 of the optical channel overhead switching unit 212. Then, the stored optical channel overhead signal is switched and outputted as the second optical channel overhead signal of the link A.

This fifth case is an operation of the optical channel overhead switching unit shown in FIG. 3. Unlike this operation, the overhead signal to be inserted into the add optical channel can be inserted into the second optical channel overhead signal of the link A which is switched and outputted at the optical channel overhead signal switching apparatus 212 and transmitted to the optical supervisory channel transmission unit 214.

As described above, the optical channel overhead switching apparatus of the optical transport network system in accordance with the present invention can switch the optical channel overhead so that the switched optical channel overhead can suppress the terminated optical channel defect to be occurred by the defect of upper layers of the optical channel or the defect of the optical channel transmitter and also can maintain the corresponding optical channel at the wavelength converted optical transport network system.

Further, the optical channel maintenance signal forwarding apparatus operating in connection with the optical overhead switching unit can transmit only the add and drop optical channel maintenance signal information to the CPU and generate the LOS suppression signal with respect to the optical channel according to the occurrence of malfunction, thus directly transmitting the suppression signal to the corresponding optical channel unit.

While the present invention has been described with respect to the particular embodiments, it will be apparent to those skilled in the art that various changes and modifications may be made without departing from the spirit and scope of the invention as defined in the following claims.

What is claimed is:

1. An apparatus for switching an optical channel overhead in an optical supervisory channel of an optical transport network system, the optical transport network system including an optical supervisory channel reception unit, an optical supervisory channel transmission unit and a central processing unit, the apparatus comprising:

a plurality of signal input units for retiming an optical overhead signal received in serial connection from the optical supervisory channel transmission unit, converting a corresponding signal into a parallel data signal, and generating a storage address matching with the corresponding signal;

a plurality of signal storage units for storing a parallel optical channel overhead signal according to the storage address information, and outputting a stored optical channel overhead signal information according to a switching address;

a switching table storage unit for storing an optical channel overhead switching information received from the central processing unit, transmitting the stored optical channel overhead switching information according to a read storage address to the central processing unit, receiving the switching address with respect to an optical channel overhead signal to be switched and outputted, and generating the storage address of the corresponding optical channel overhead signal according to the switching information stored in switching address;

a signal output timing unit for generating the switching address of the corresponding optical channel overhead signal according to an optical channel overhead signal to be outputted, and generating a first timing for aligning a switched data to a corresponding link, a second timing for converting the aligned optical channel overhead signal data into a serial data, and a third timing for outputting the aligned optical channel overhead signal data;

a plurality of data alignment units for receiving the switched optical channel overhead signal and aligning the optical channel overhead signal to a corresponding link and channel using the first timing;

a drop data alignment unit for receiving a switched drop optical channel overhead signal and aligning a drop optical channel overhead signal using the first timing; and a plurality of signal output units for receiving aligned parallel data from the plurality of data alignment units according to the links, converting the aligned parallel data into serial data according to the second timing, and transmitting the received optical channel overhead signal to the optical supervisory channel transmission unit of the corresponding link.

2. The apparatus as recited in claim 1, further comprising an add signal storage unit for storing an add optical channel overhead signal from the central processing unit, and transmitting a stored add optical channel overhead signal information according to the switching address.

3. The apparatus as recited in claim 2, wherein the add signal storage unit stores an overhead signal with respect to an optical channel that is added before switching.

4. The apparatus as recited in claim 2, wherein the add signal storage unit stores an overhead signal with respect to an optical channel to be added after switching.

5. The apparatus as recited in claim 1, further comprising an interface unit for receiving a switching information of an optical channel overhead from the central processing unit to transmit data and address to the switching table storage unit, transmitting the switching information stored at the switching table storage unit to the central processing unit, receiving an add optical channel overhead signal information from the central processing unit to transmit a corresponding address and a corresponding add optical channel overhead signal data to the add signal storage unit.

6. An apparatus for forwarding an optical channel maintenance signal in an. optical transport network system. the apparatus for switching an optical channel overhead of the optical supervisory channel, the apparatus comprising:

a first extraction unit for extracting an OCT maintenance signal from a drop optical channel overhead signal received from a drop data alignment unit;

a second extraction unit for extracting a FDI maintenance signal from the drop optical channel overhead signal received from the drop data alignment unit;

an input unit for receiving an OCI maintenance signal input data from a central processing unit;

a first signal comparison unit for performing a logical OR operation of signals received from the first extraction unit and the input unit and combining the OCT maintenance signal;

a first signal storage unit for storing the combined OCT maintenance signal;

a second signal storage unit for storing the FDI maintenance signal; and a second signal comparison unit for performing a logical OR operation of signals received from the first and second signal storage units and generating an optical channel LOS suppression signal.

7. The apparatus as recited in claim 6, wherein the first extraction unit extracts an OCh-FDI-O signal among the drop optical channel overhead signals received from the drop data alignment unit, and suppresses the activation of the OCT maintenance signal with respect to a corresponding channel when the extracted OCh-FDI-O signal is activated.

8. The apparatus as recited in claim 6, wherein the second extraction unit extracts an OCh-FDI-O signal among the drop optical channel overhead signals received from the drop data alignment unit, and suppresses the activation of the FDI maintenance signal with respect to a corresponding channel when the extracted OCh-FDI-O signal is activated.

* * * * *